United States Patent [19]

Marsh

[11] Patent Number: 5,095,657
[45] Date of Patent: Mar. 17, 1992

[54] DOOR SEAL

[76] Inventor: Richard B. Marsh, 49680 Leona Dr., Mount Clemens, Mich. 48043

[21] Appl. No.: 760,823

[22] Filed: Sep. 17, 1991

Related U.S. Application Data

[63] Continuation of Ser. No. 604,903, Oct. 26, 1990, abandoned, which is a continuation-in-part of Ser. No. 42,540, Apr. 27, 1987, abandoned, which is a continuation of Ser. No. 820,150, Jan. 21, 1986, abandoned.

[51] Int. Cl.⁵ .................................................. E06B 7/16
[52] U.S. Cl. .......................................... 49/486; 49/492
[58] Field of Search ................. 49/475, 484, 485, 486, 49/487, 489, 492, 495, 498; 126/190; 24/297, 292; 52/718.1

[56] References Cited

U.S. PATENT DOCUMENTS

| | | |
|---|---|---|
| 1,998,791 | 4/1935 | Schanz . |
| 2,546,049 | 3/1951 | Weaver et al. . |
| 2,823,660 | 2/1958 | Holzboog et al. . |
| 2,910,209 | 10/1959 | Nelson . |
| 3,140,517 | 7/1964 | Richter . |
| 3,407,016 | 10/1968 | Kronenberger ............. 49/486 |
| 3,603,035 | 9/1971 | Kaldenberg . |
| 3,732,646 | 5/1973 | Horvay et al. . |
| 3,765,400 | 10/1973 | Meier et al. . |
| 3,810,483 | 5/1974 | Vonderhaar . |
| 3,909,883 | 10/1975 | Fegen . |
| 3,926,469 | 12/1975 | Ulics . |
| 4,077,389 | 3/1978 | Vogel . |
| 4,214,517 | 7/1980 | Caldwell . |
| 4,223,660 | 9/1980 | Lang . |
| 4,229,921 | 10/1980 | Schell . |
| 4,248,017 | 2/1981 | Micallef . |
| 4,299,412 | 11/1981 | Parmann . |
| 4,417,420 | 11/1983 | Marsh . |
| 4,512,331 | 4/1985 | Levi . |
| 4,617,759 | 10/1986 | Pasqualini et al. . |

FOREIGN PATENT DOCUMENTS 431893 9/1967 Switzerland .

*Primary Examiner*—Kenneth J. Dorner
*Assistant Examiner*—Gerald A. Anderson
*Attorney, Agent, or Firm*—Harness, Dickey & Pierce; Harness, Dickey & Pierce

[57] ABSTRACT

A clipless door seal for oven doors or the like including a sealing element having a length greater than its width, a pair of resilient elongated flanges depending from the outer surface of the sealing element and running substantially the entire length of the sealing element, and at least two resilient retaining darts for securing the door seal to an oven door surface. Generally, the door seal is positioned onto an oven door or the like which has at least two apertures for securing the door seal to the door surface. The darts are positioned through the apertures for securing the door seal onto the door wherein said elongated flanges provide bias to permit said darts to fully pass beyond the wall forming the door surface.

14 Claims, 1 Drawing Sheet

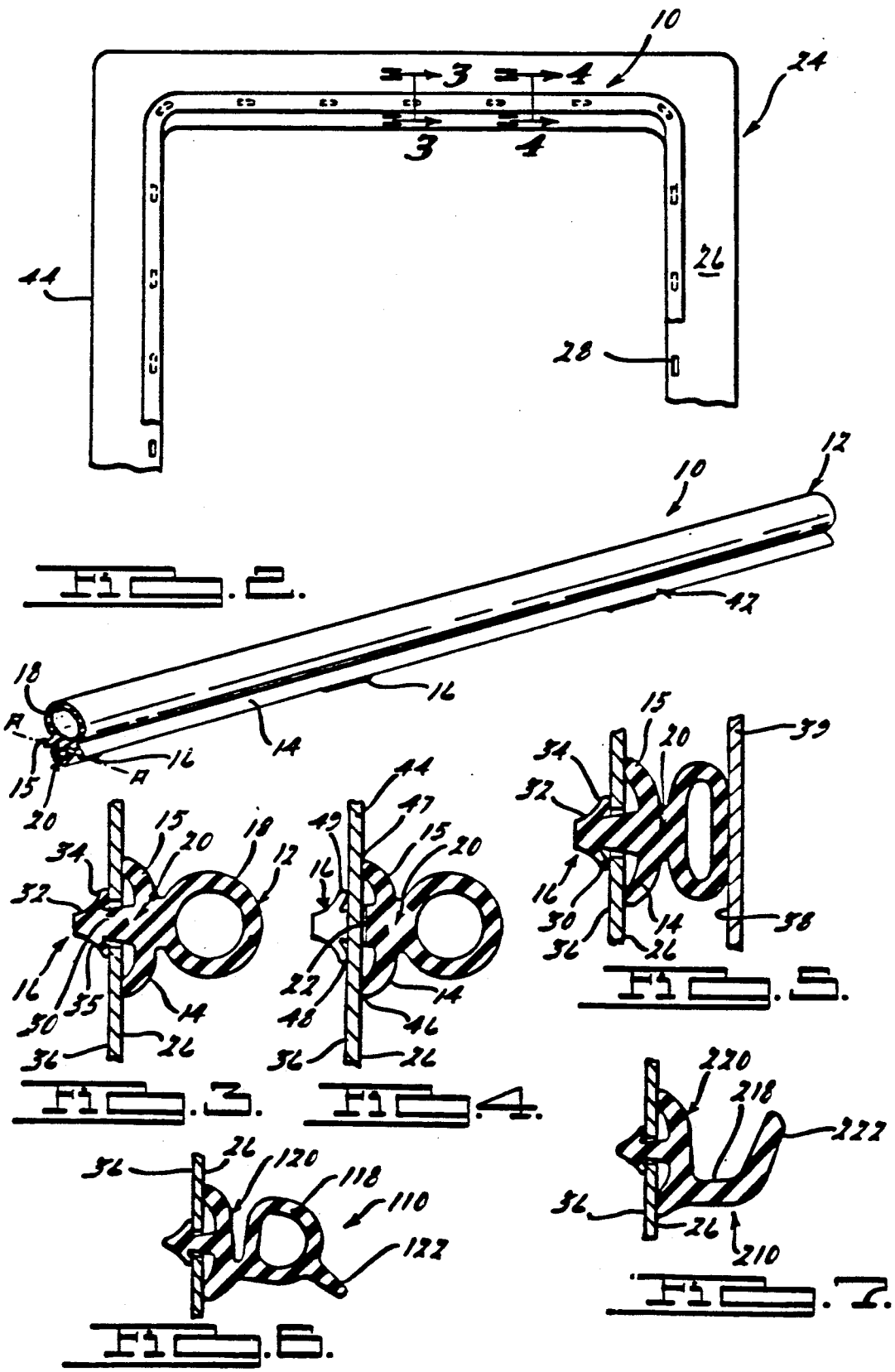

DOOR SEAL

CROSS REFERENCE TO RELATED APPLICATIONS

This application is a continuation of Ser. No. 74/604,903, filed Oct. 26, 1990, now abandoned which is a continuation-in-part of U.S. Pat. application Ser. No. 042,540, filed Apr. 27, 1987, now abandoned, which is a continuation of U.S. Pat. application Ser. No. 820,150, filed Jan. 21, 1986 entitled "Door Seal", now abandoned.

BACKGROUND AND SUMMARY OF THE INVENTION

The present invention relates to oven door seals or the like and more particularly to a clipless door seal for ovens or the like.

The prior art teaches several different types of door seals. U.S. Pat. Nos. 1,998,791 (Schanz) and 3,140,517 (Richter) teach the use of an elongated element running the entire length of the seal for securing the seal to a surface. U.S. Pat. No. 2,823,660 (Holzboog) teaches the use of a cotter pin attached behind the door wall for securing the seal to a surface. U.S. Pat. No. 3,732,646 (Horvay) uses a foamed plastic body member as the securing and sealing element. U.S. Pat. Nos. 3,765,400 (Meier), 3,810,483 (Vonderhaar), 4,077,389 (Vogel), 4,223,660 (Lang), 4,248,017 (Micallef), and 4,417,420 (Marsh) teach the use of some form of metallic clip attached to the ends of the seal for securing the seal to a door surface. U.S. Pat. No. 4,512,331 (Levi) teaches the use of an integral cylindrical retaining portion interfit in a door gap for securing the seal to a surface.

The prior art devices have several disadvantages. The Schanz or Richter retaining elements require a continuous groove in the door or oven surface for securing the seal onto the surface. If a cotter pin is used, it must be secured to the seal from behind the surface which the seal is being secured. Alternatively, foamed plastic materials are not capable of withstanding the increased temperatures incurred in conventional oven operations. Metal securing clips require the metallic clip to be secured to the rubber seal encountering labor expense, or, in the case of Vonderhaar, both significant labor expense and significant expense for the bonding material. Vonderhaar also has several problems incurred during this metal to rubber bonding process. The cylindrical retainer portion seals of Levi require a continuous groove in the oven door front also significantly adding to the expense of manufacturing of the door.

The present invention overcomes the disadvantages of the prior art by providing an effective clipless, inexpensive integral oven door seal. The door seal of the present invention includes a sealing element and a retaining element. The sealing element includes an elastomeric seal body having a length substantially greater than its width and a pair of elongated resilient flanges depending from the seal body and running substantially the entire length of the elongated seal body. The retaining element generally includes a plurality of darts which are positioned between the flanges and depend from the seal body to secure the seal to a desired surface. Also a longitudinally extending support member may be positioned between the flanges to extend from dart to dart and aids in the sealing effect and stability of the oven door seal. The attachment surface, usually the oven door or front wall of an oven, has a plurality of apertures in which the darts are inserted to secure the oven seal onto the door surface.

By recognizing the spring-like qualities of rubber, the base of the seal was made concave so that the points of the darts can be allowed to pass easily beyond the inside of an aperture cut in the oven door or front wall of the oven. When beyond the metal, the dart points expand beyond the aperture width. When insertion pressure is stopped, the concave base that is flattened under insertion pressure resumes its concave shape and pulls the dart firmly against the wall around the aperture giving a firm attachment of the seal to the metal wall.

The concave section also serves a second purpose beyond the spring back. When cutting away the part of the dart not to be used in mounting the seal, in the customary flat bottom seal any extra rubber left on the bottom interferes with the sealing of the bottom against the metal. In production, it would be difficult to cut absolutely flush with the bottom leaving a bump on the bottom. With the spring back concave bottom on the seal, the two feet of the seal flanges can be folded back to cut the dart where it is not needed and form a support member. The support member does not need to be flush to be safely out of the position where it would interfere with the seating of the seal against the metal wall.

Any number of rubber darts can be used without increasing the cost (other than the original tooling cost on the oven front or door for the apertures). The seal can have its darts at the selected regular intervals which would provide the best grip, but in any event allowing the gasket or rubber strip to be cut continuously.

The feet on the bottom of the seal flanges also provide a low pressure deflection point where the pressure of the rubber darts (at the darts) or the pressure of the mating surface (away from the darts) will keep the feet in intimate contact with the metal wall effecting the best seal possible.

By cutting the rubber darts on centers slightly shorter than the aperture centers, two things are accomplished. When inserting the darts into the apertures, some elongation takes place in the rubber and the shorter centers will compensate for the stretch. After installation, the rubber returns to its original length giving a slight lateral stretch to the seal to keep its bend around the corners smooth and tight. It also would allow enough tension to absorb any thermal expansion that may occur during operation of the oven.

The cross sectional dimensions of the dart can be varied to permit ease of installation and the firmness of the grip to be regulated and maintained. The length of the rubber dart can also be varied, which makes it conceivable to shorten it to a length suitable to mount into a hole. Initially, the aperture will give more support and directional stability to the seal.

The all silicone rubber gasket or seal could be easily replaced if it became damaged. It is a true one piece gasket and if made from a good quality material can be removed and reused if necessary.

Other objects and advantages of the present invention will be apparent in the following specification, claims, and drawings.

BRIEF DESCRIPTION OF THE DRAWINGS

FIG. 1 is an elevational view of the interior surface of an oven door having a seal securing thereon;

FIG. 2 is a partial perspective view of a door seal in accordance with the present invention;

FIG. 3 is a cross-sectional view taken along line 3—3 of FIG. 1;

FIG. 4 is a cross-sectional view taken along line 4—4 of FIG. 1;

FIG. 5 is a view similar to FIG. 2 but illustrating the seal flanges and a dart in a compressed position;

FIG. 6 is a cross-sectional view similar to FIG. 3 of an alternative embodiment of the present invention; and FIG. 7 is a cross-sectional view similar to FIG. 3 of another alternative embodiment of the present invention.

DETAILED DESCRIPTION OF THE PREFERRED EMBODIMENT

Referring to the drawings and in particular to FIGS. 1 and 2, an oven door seal is illustrated which is identified generally by reference numeral 10. The oven door seal 10 comprises an elastomeric sealing element 12 having a length substantially greater than its width, a pair of resilient elongated flanges 14 and 15 depending from and extending the length of the sealing element 12, a plurality of resilient retaining darts 16 depending from the sealing element 12 and positioned between the flanges 14 and 15, a deformable body portion 18, a base portion 20, and a support member 22 depending from the base portion 20, disposed between the flanges 14 and 15 and set in the spacing between the darts 16. The door seal 10 as illustrated is extruded from silicone rubber in an integral unitary construction.

FIG. 1 illustrates the door seal 10 secured to an oven door 24, although the present invention is also capable of being secured to a mating surface to an oven door surface such as the outer surface of the periphery of the oven opening which the oven door 24 closes. The oven door 24 has a wall 44 having an exterior surface 26, an interior surface 36, and a plurality of apertures 28 in the wall 44. The exterior surface 26 of the wall 44 is normally the interior surface of the door 24. The darts 16 of the door seal 10 insert through apertures 28 to secure the door seal 10 onto the surface 26 of the wall 44 (FIG. 3).

Referring to FIG. 3, the body portion 18, a cylindrical bulb design in the first embodiment, contacts a mating surface, such as the surface 38 of an oven wall 39, as shown in FIG. 5, when the door 24 is closed. When the door seal 10 is secured to the door wall 44, the flanges 14 and 15 resiliently abut the outer surface 26 of the door wall 44. A biasing force exists between the flanges 14 and 15 and the door wall 44 when the door seal 10 is in a noncompressed position as shown in FIG. 3.

The darts 16 have a neck portion 30 and a head portion 32. The neck portion 30 is adjacent the support member 22 and projects therefrom. The head portion 32 projects from one end of the neck portion 30 and has a pair of flanges 34 and 35 projecting from the head portion 32 at an acute angle with respect to the neck portion 30.

Generally, the flanges 14 and 15, support member 22, and dart neck portion 30 are disposed to enable the flanges 14 and 15 to exert a biasing force on the outer surface 26 of the door wall 44 when the door 24 is open to maintain the flanges 34 and 35 of the darts 16 in a position in the interior of the door wall 44 where the dart flanges 34 and 35 always secure the door seal 10 onto the door 24 as shown in FIG. 4. Line A—A of FIG. 2 indicates the at rest position of flanges 34 and 35 (or later described flanges 48 and 49) wherein line A—A is formed by connecting the uppermost point of each flange 34 and 35 (or 48 and 49) as the seal is disposed in FIG. 2. As shown in FIG. 2, this line intersects the flanges 14 and 15 when the seal is not disposed on a door.

The door seal 10 is secured to the door 24 by placement of the retaining darts 16 in the door apertures 28. A first dart 16 is placed into an aperture 28. A force is exerted on the dart 16 forcing the dart through the aperture 28 and flattening the flanges 14 and 15 at the dart 16. When the force is removed, the oven seal 10 springs into a noncompressed position, as in FIGS. 3 or 4. The distance between adjacent apertures 28 is slightly greater than the distance between adjacent darts 16. The door seal 10 is slightly stretched when mounted to create a longitudinal tension force in the door seal 10. The process of forcing the retaining darts 16 into the door apertures 28 continues until the door seal 10 is completely secured about the door 24. The seal 10 may even be used continuously at corners with apertures 28 disposed at proper locations and spaced more closely together (not shown) or angulated (as seen in FIG. 1).

As seen in FIG. 5, the support member 22 provides the seal between the door seal 10 and the door wall 44 when the oven door 24 is closed. Preferably, the support member 22 is a continuous bead having the darts 16 projecting from the support member 22 at predetermined intervals. The support member 22 also provides the door seal 10 with stability between the retaining darts 16. Due to the relative disposition of the seal flanges 14 and 15, the support member 22, and the darts 16, the elongated feet 46 and 47 on the bottom of the seal flanges 14 and 15 provide a low pressure deflection point where the pressure of the rubber darts 16 (via the dart flanges 48 and 49 biased against the interior surface 36 of the wall 44) at the position of the darts 16 or the pressure of the mating surface (when the door 24 is closed against an oven) will keep the feet 46 and 47 in intimate contact with the door surface 36, effecting the best seal possible.

FIG. 5 illustrates an alternative embodiment seal 110 of the present invention representing a modification of the sealing element. The sealing element 112 has a body portion 118, a base portion 120, and a flange portion 122. The sealing element 112, through the body portion 118 and flange portion 122, effects a seal between the door seal 110 and the oven surface 38. The remainder of the door seal 110 is substantially the same as that previously discussed and functions in the same manner.

FIG. 6 illustrates another embodiment of a seal 210 of the present invention representing a modification of the sealing element. The sealing element 212 has a flange portion 222, a wall portion 218, and a base portion 220. The sealing element 212, through the flange portion 222 and wall portion 218, effects a seal between the door seal 110 and the oven surface 38. The remainder of this modified door seal is substantially the same as that previously discussed and functions in the same manner.

While it will be apparent that the preferred embodiment of the invention disclosed is well calculated to fulfill the above stated objects, it will be appreciated that the invention is susceptible to modification, variation and change without departing from the proper scope or fair meaning of the subjoined claims.

I claim:

1. An elastomeric, resilient door seal for sealing ovens that mounts between a first smooth surfaced wall with apertures and a second juxtaposed smooth surfaced wall comprising:

a body portion;

an integral seal member independently extending from said body portion for engagement with said smooth surface on said second wall;

a plurality of integral attachment darts, for insertion into said apertures, which each have a neck portion longer than said first wall thickness, extending a distance away from said body portion to a barbed head which has two integral barbed portions extending away from the head and back towards the body portion at an acute angle with respect to the neck portion;

a support surface which provides an additional sealing surface extending between said darts from said body portion for engagement with said first wall; and two lip seal members which extend from said body portion independent from one another and from the seal member at locations along the sides of said body portion outwardly and toward said first wall such that after said attachment darts are inserted into said apertures, said barbed portions are compressed and engaged with a rear surface of said first wall, and said lip seal members are compressed and engaged with a front surface of said first wall in an apposing manner thereby firmly seating said seal in place, independent of said seal member's engagement with said second wall, by maintaining said opposed compressed engagement of said barbed portions and said lip seal members while further enclosing said support surface and said apertures.

2. The seal according to claim 1, wherein said seal is made of an elastomeric material.

3. The seal according to claim 1, wherein said seal is extruded from silicone rubber.

4. The seal according to claim 1, wherein said seal is stretched longitudinally before said darts are inserted into said apertures.

5. The seal according to claim 1, wherein said lip seal members combine to form a generally concave configuration across their cross section.

6. The seal according to claim 1, wherein said lip seal members are generally symmetric to each other with respect to said body portion.

7. The seal according to claim 1, wherein said darts are spaced at regular intervals.

8. The seal according to claim 1, wherein a separate member placed in contact with the support surface to provide support for the seal and to enhance the sealing capability of the seal.

9. The seal according to claim 1, wherein said support surface of said body member serves the dual purpose of providing an additional sealing surface while also providing a supporting surface for the seal.

10. The seal according to claim 1, wherein a continuous bead depends from said body portion to provide said support surface.

11. The seal according to claim 10, wherein said continuous bead has darts extending from it.

12. The seal according to claim 1, wherein said barbed portions form a gap defined by an interior surface of said barbed portion, an interior surface of said first wall and said neck surface, thereby preventing rough surfaces on the barbed portions and the interior surface of said first wall from interfering with the insertion of said darts into said apertures, and from interfering with the ability of said barbed portion to seat properly against said interior surface of said first wall.

13. The seal according to claim 1, wherein each of said lip seal members forms a gap defined by an interior surface of the lip seal member, an exterior surface of said first wall and a side surface of said body portion, thereby preventing rough surfaces on the lip seal members and the exterior surface of said first wall from interfering with the insertion of said darts into the apertures, and from interfering with the ability of said lip seal members to seat against said exterior surface of said first wall.

14. The seal according to claim 1, wherein said seal in an unstressed state having a line extending from a distal end of one lip seal member transversely across to a distal end of said other lip seal member, and a line extending from a distal end of one barb portion transversely across to a distal end of said other barb portion that are generally parallel and spaced apart a distance less than the thickness of said first wall.

* * * * *